Dec. 8, 1936.　　　　　M. W. WASHINGTON　　　　　2,063,774
SHOVEL
Filed Feb. 3, 1936
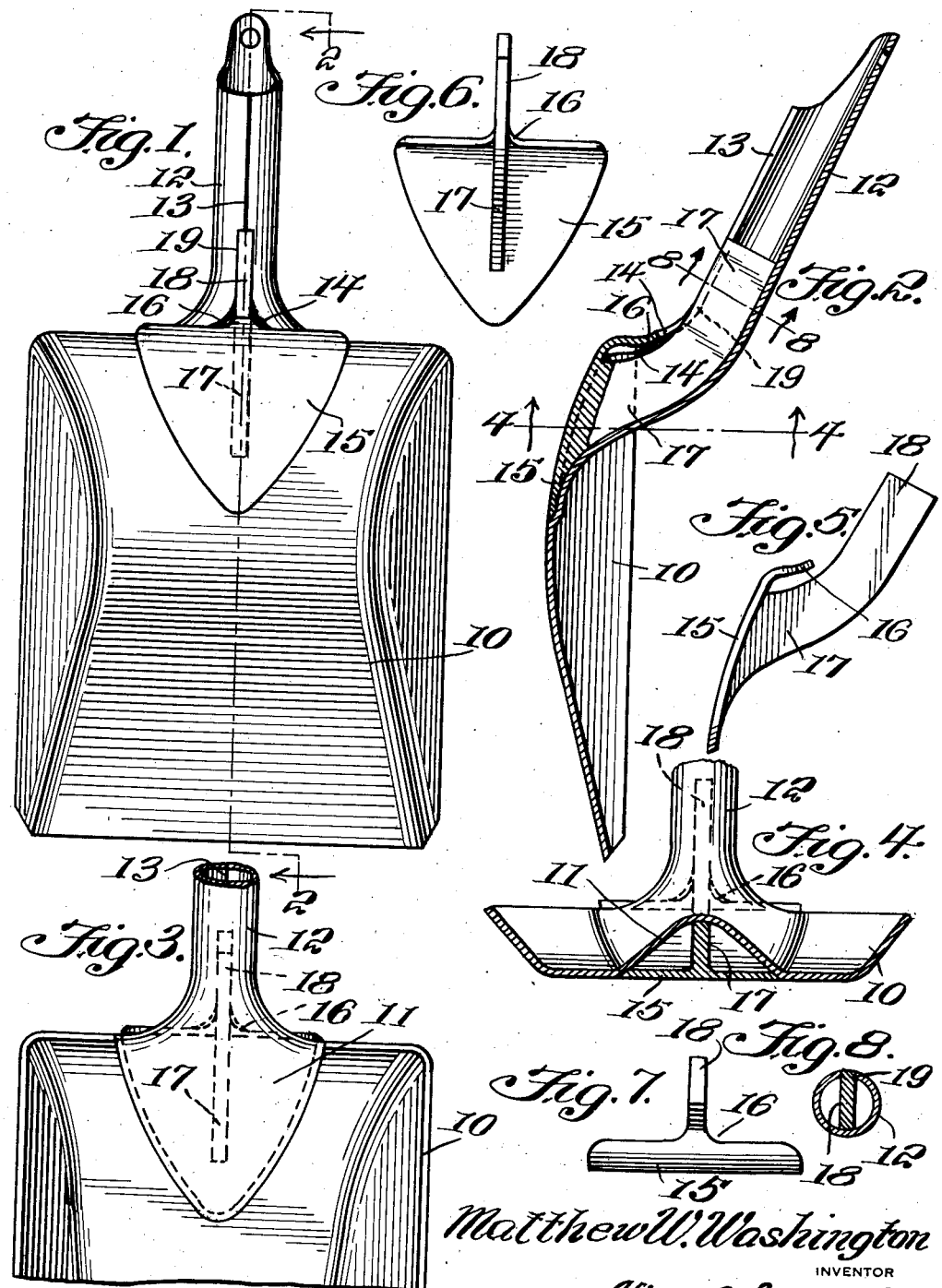
Matthew W. Washington
INVENTOR
BY Victor J. Evans & Co.
ATTORNEY Patented Dec. 8, 1936

2,063,774

UNITED STATES PATENT OFFICE 2,063,774

SHOVEL

Matthew William Washington, Dunkirk, N. Y.

Application February 3, 1936, Serial No. 62,198

1 Claim. (Cl. 294—49)

The invention relates to a shovel and more especially to a pressed steel shovel.

The primary object of the invention is the provision of a shovel of this character, wherein the same is materially braced and reinforced to avoid the breaking thereof at the juncture of the shank of the handle with the body of the shovel and also to eliminate the breaking down of the back of the shovel by buckling so that the said shovel will withstand severe usage.

Another object of the invention is the provision of a shovel of this character, wherein the shank for the handle is reinforced next to the body of the shovel and particularly at the fulcrum area of said body so that the said shovel is assured of increased life and wear.

A further object of the invention is the provision of a shovel of this character, which is simple in construction, thoroughly reliable and efficient in its purposes, comparatively light in weight yet strong and durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a bottom plan view of the shovel constructed in accordance with the invention.

Figure 2 is a sectional view on the line 2—2 of Figure 1 looking in the direction of the arrows.

Figure 3 is a fragmentary top plan view.

Figure 4 is a sectional view on the line 4—4 of Figure 2 looking in the direction of the arrows.

Figure 5 is a side elevation of the bracing medium for the shovel.

Figure 6 is a plan view thereof.

Figure 7 is a rear end elevation.

Figure 8 is a sectional view on the line 8—8 of Figure 2 looking in the direction of the arrows.

Similar reference characters indicate corresponding parts throughout the several views in the drawing.

Referring to the drawing in detail, the shovel comprises a blade or body 10 stamped or otherwise formed from sheet metal, preferably sheet steel, having a raised substantially heart-shaped frog fitting the portion 11 at the heel end of the said blade, the said portion being of inverted substantially V-shape in cross section and has integrally formed therewith a shank 12 which is split tubular in form, the split line being indicated at 13. Accommodated within the shank 12 is the lowermost end of a handle (not shown). The split 13 spreads apart at the lower end thereof as at 14.

The hollow side of the portion 11 opens through the bottom face of the shovel blade 10 and fitted within this open side is a frog 15, it being correspondingly shaped to the portion 11 and is formed with a tongue 16 accommodated within the spread portion 14 of the split 13 while integral with the frog at the longitudinal center thereof is a bracing extension or arm 17, it being carried upwardly through the shank 12 for a distance thereof and the rearmost edge of this extension or arm 18 is accommodated in a notch 19 formed with the split 13 in the shank 12. The frog 15 is joined with the blade 10 by welding or otherwise for the uniting of this frog therewith and also the extension or arm 17 with the shank 12, the portion 11 of the blade 10 being in straddling relation to the extension or arm 17 as is clearly shown in Figure 4 of the drawing. In this manner the blade at the juncture of the shank 12 therewith is materially reinforced and this area, namely the heel end, being the fulcrum point for the blade 10 when handling the shovel.

It should be apparent from Figures 1, 2, 3 and 4 of the drawing that the blade and shank of the shovel are materially reinforced at the location where the greatest strain occurs under severe usage of the shovel.

What is claimed is:

A shovel of the kind described comprising a blade having a split tubular shank for a handle, a raised portion formed in the blade at the longitudinal median and at its heel, a frog fitting the raised portion and having an extension carried into the tubular shank, the said frog and raised portion being integrally united, and a tongue formed on the frog and fitting the split in the said shank, the said split in the shank being spread to accommodate the tongue and the shank being provided with a notch accommodating the rearmost edge of said extension.

MATTHEW WILLIAM WASHINGTON.